United States Patent
Takahashi et al.

(10) Patent No.: US 9,108,166 B2
(45) Date of Patent: Aug. 18, 2015

(54) SILICA MEMBRANE AND METHOD FOR MANUFACTURING THE SAME

(75) Inventors: Naoko Takahashi, Nagoya (JP); Kouta Asai, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 1008 days.

(21) Appl. No.: 13/182,589

(22) Filed: Jul. 14, 2011

(65) Prior Publication Data

US 2012/0018370 A1 Jan. 26, 2012

(30) Foreign Application Priority Data

Jul. 22, 2010 (JP) ................................ 2010-164495

(51) Int. Cl.
| | |
|---|---|
| *B01D 71/02* | (2006.01) |
| *B01D 53/22* | (2006.01) |
| *B01D 61/36* | (2006.01) |
| *B01D 63/06* | (2006.01) |
| *B01D 69/02* | (2006.01) |
| B01D 67/00 | (2006.01) |

(52) U.S. Cl.
CPC ............ *B01D 71/027* (2013.01); *B01D 53/228* (2013.01); *B01D 61/362* (2013.01); *B01D 63/066* (2013.01); *B01D 67/0048* (2013.01); *B01D 69/02* (2013.01); *B01D 67/0039* (2013.01); *B01D 67/0081* (2013.01); *B01D 71/02* (2013.01); *B01D 2323/08* (2013.01); *B01D 2323/12* (2013.01); *B01D 2323/42* (2013.01); *B01D 2325/28* (2013.01)

(58) Field of Classification Search
CPC ........... B01D 2323/08; B01D 2323/12; B01D 53/228; B01D 61/362; B01D 63/066; B01D 67/0048; B01D 69/02; B01D 71/027

USPC ........... 210/490, 496, 510.1, 500.25, 500.26, 210/506; 264/621, 42, 43
See application file for complete search history.

(56) References Cited

U.S. PATENT DOCUMENTS 5,194,200 A * 3/1993 Anderson et al. .......... 210/510.1
5,772,735 A    6/1998 Sehgal et al.
(Continued)

FOREIGN PATENT DOCUMENTS

| JP | 04-063119 A1 | 2/1992 |
|---|---|---|
| JP | 2008-246304 A1 | 10/2008 |

(Continued)

OTHER PUBLICATIONS

Masashi Asaeda, Yoshikazu Sakou, Jianhua Yang, Keiko Shimasaki, Stability and performance of porous silica—zirconia composite membranes for pervaporation of aqueous organic solutions, Journal of Membrane Science 209 (2002) 163-175.*

(Continued)

*Primary Examiner* — David C Mellon
*Assistant Examiner* — Pranav Patel
(74) *Attorney, Agent, or Firm* — Burr & Brown, PLLC

(57) ABSTRACT

There is provided a silica membrane 1 formed on a porous substrate. A desorbed ionic strength of water having a temperature of 500° C. in a temperature-programmed desorption analysis of water of the silica membrane is 2,000,000/g. The silica membrane 1 is manufactured by allowing a silica sol having a water concentration of 0.03 to 3 mass % to adhere to a porous substrate by an ethanol solvent, drying the silica sol by sending air having a dew point of −70 to 0° C., and firing the dried silica sol at 200 to 400° C.

4 Claims, 6 Drawing Sheets

(56) References Cited

U.S. PATENT DOCUMENTS

2002/0142172 A1* 10/2002 Brinker et al. ............ 428/446
2008/0096751 A1    4/2008 Isomura et al.
2009/0246114 A1   10/2009 Sah et al.

FOREIGN PATENT DOCUMENTS

| JP | 2009-241054 | A1 | 10/2009 |
| WO | 2008/050814 | A1 | 5/2008 |

OTHER PUBLICATIONS

Norio Hirashita, et al., *"Thermal Desorption and Infrared Studies of Plasma-Enhanced Chemical Vapor Deposited SiO Films with Tetraethyiorthosilicate,"* Japan Journal of Applied Physics, vol. 32, Part 1, No. 4, Apr. 1993, pp. 1787-1793.

Sumio Sakka, et al., *"Science of Sol-gel Method,"* Agunesushofu Ltd., p. 154-163.

* cited by examiner ical porous membrane is formed by allowing the ceramic sol to adhere to the porous substrate, drying the ceramic sol, and firing and generally used unitarily with the porous substrate functioning as the support.

2. Description of Related Art

There is known a method where the acid resistance of the separation membrane is improved by setting the firing temperature to be high to suppress the decrease of water permeation amount with the passage of time (JP-A-4-63119). There is known a method where a membrane is formed by pouring a silica sol into a porous substrate by natural flowing as a method of adhesion of silica sol (WO No. 2008/050814 pamphlet). Further, it is known that the ceramic porous membrane having high separation performance can be obtained by the use of ceramic sol having a sol concentration of 0.05 to 0.7 mass % (JP-A-2009-241054). On the other hand, there is known a method where a coating liquid obtained by diluting a ceramic sol undiluted solution with isopropyl alcohol is allowed to adhere to the substrate and then drying the coating liquid by blast drying in order to obtain a ceramic porous membrane having few defects, a thin membrane thickness, and small pore size (JP-A-2008-246304).

However, the water permeation amount is not sufficient in the conventional method, and further increase in the water permeation amount is desired. In order to improve the water permeation amount, it is necessary to decrease the number of times the membrane is formed. However, the number of the number of the membrane formation times is decreased, the separation coefficient falls. In addition, there is a problem of decrease in the water permeation amount with the passage of time. This is because the organic solvent enters the membrane pores and is adsorbed to the surfaces to hinder the water permeation. If the firing temperature is raised in order to inhibit it, the pore size is decreased, and the organic solvent is inhibited to enter the pores. However, the permeation amount is decreased. In addition, firing at high temperature has a problem of increasing the production costs.

SUMMARY OF THE INVENTION

The present invention aims to provide a silica membrane which has more improved water permeability than a conventional one and where the decrease of the water permeation amount with the passage of time is inhibited and a manufacturing method thereof.

The present inventors found out that the aforementioned problems can be solved by specifying the concentration and conditions for drying and firing of silica sol. That is, according to the present invention, there are provided the following silica membrane and manufacturing method thereof.

[1] A silica membrane formed on a porous substrate, wherein a desorbed ionic strength of water having a temperature of 500° C. in a temperature-programmed desorption analysis of water of the silica membrane is 2,000,000/g or more.

[2] The silica membrane according to [1], wherein the silica membrane selectively separates water from an organic solvent containing water.

[3] The silica membrane according to [2], wherein the organic solvent has a molecular weight of 60 or more.

[4] The silica membrane according to [3], wherein the organic solvent is an aromatic compound.

[5] A method for manufacturing a silica membrane comprising: allowing a silica sol having a water concentration of 0.03 to 3 mass % with an ethanol solvent to adhere to a porous substrate, drying the silica sol by blowing air having a dew point of −70 to 0° C., and firing the dried silica sol at 200 to 400° C.

According to a method for manufacturing a silica membrane of the present invention, by specifying the concentration and conditions of drying and firing of silica sol, there can be obtained a silica membrane having a large desorbed ionic strength of water having a temperature of 500° C., that is, a hydrophilic silica membrane. In a silica membrane of the present invention, a desorbed ionic strength of water having a temperature of 500° C. is 2,000,000/g or more, and the water permeation amount is improved in comparison with a conventional silica membrane.

REFERENCE NUMERALS

1: silica membrane, 10: ceramic filter, 11: porous substrate, 12: glass seal, 14: UF membrane, 22: partition wall, 23: cell, 25: inlet side end face, 30: dehumidification blower, 31: gas feed side space, 32: gas permeation side space, 33: o-ring, 37: SUS module, 37a: feed gas introduction port, 37b: feed gas discharge port, 37c: gas collection port, 40: silica sol solution (coating liquid), 41: masking tape

DETAILED DESCRIPTION OF THE INVENTION

Hereinbelow, an embodiment of the present invention will be described with referring to Figures. The present invention is not limited to the following embodiment, and changes, modifications, and improvements may be made as long as they do not deviate from the scope of the invention.

Figure 1:
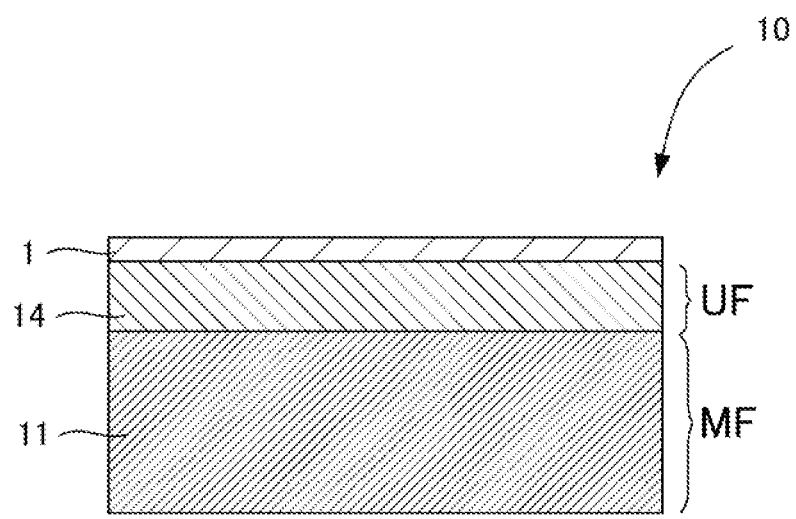
FIG. 1 is a cross-sectional view of a ceramic filter as one embodiment of the present invention.
Figure 2:
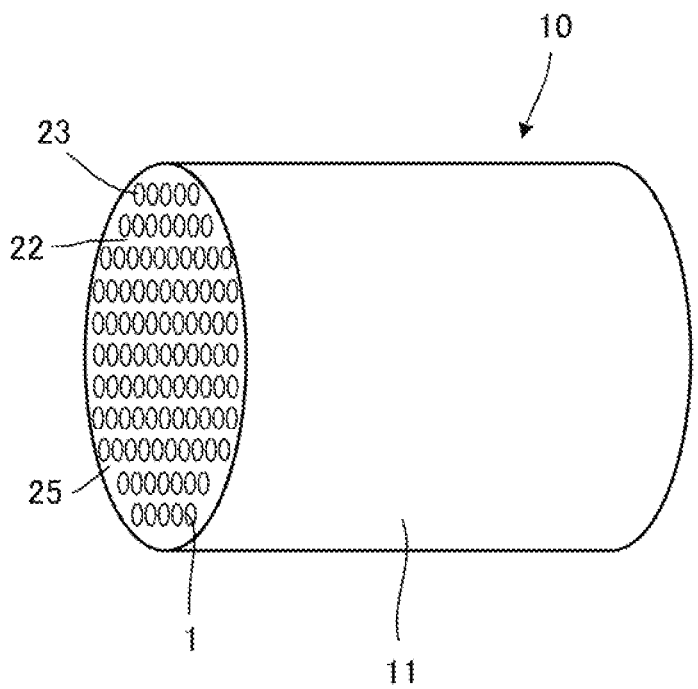
FIG. 2 is a perspective view showing a ceramic filter as one embodiment of the present invention.

FIG. 1 is a cross-sectional view of a ceramic filter 10 where a silica membrane 1 is formed on the porous substrate 11. FIG. 2 is a perspective view of a ceramic filter 10 where a silica membrane 1 is formed on the porous substrate 11. The silica membrane 1 of the present invention is a silica membrane 1 formed on the porous substrate 11, and a desorbed ionic strength of water having a temperature of 500° C. in a temperature-programmed desorption analysis of water of the silica membrane 1 is 2,000,000/g or more. The desorbed ionic strength of water means the amount of water detected by desorption from a sample (silica membrane 1) when the sample (silica membrane 1) is heated under high vacuum by temperature-programmed desorption. Hydrophilicity of the sample (silica membrane 1) can be evaluated by the desorbed ionic strength of water. The silica membrane 1 of the present invention is a highly hydrophilic membrane where a desorbed ionic strength of water having a temperature of 500° C. is 2,000,000/g or more, more preferably 3,500,000/g or more. Incidentally, the described ionic strength of water is preferably high. However, in consideration of production costs and the like, the intensity is industrially about 2,000,000 to 7,000,000/g. The silica membrane 1 of the present invention has an improved water permeation amount in comparison with a conventional separation membrane.

The silica membrane 1 of the present invention is a separation membrane for selectively separating water from an organic solvent containing water. The organic solvent means the overall organic solvents including alcohol, ester, aromatic compounds, organic acid, and the like. A silica membrane 1 of the present invention is particularly suitable for separating water from an organic solvent having a molecular weight of 60 or more (e.g., acetic acid). In the case of separating water from an organic solvent having high molecular weight by a separation membrane, the water permeation amount tends to decrease. However, a silica membrane 1 of the present invention hardly has the decrease in the water permeation amount. Further, a silica membrane 1 of the present invention is suitable because the decrease in the water permeation amount is hardly caused in the case that the organic solvent is an aromatic compound. An example of the aromatic compound is phenol.

A method for manufacturing a silica membrane 1 of the present invention is a method for manufacturing a silica membrane 1 by allowing a silica sol having a water concentration of 0.03 to 3 mass % with an ethanol solvent to adhere to a porous substrate 11, drying the silica sol by blowing air having a dew point of −70 to 0° C., and firing the dried silica sol at 200 to 400° C. Here, the dew point means temperature where the water vapor partial pressure in the air becomes equal to the saturated pressure and where the condensation of water vapor is observed when the temperature of the air containing the water vapor is lowered.

The silica sol allowed to adhere to the porous substrate 11 has a water concentration of preferably 0.03 to 3 mass %, more preferably 0.03 to 1.5 mass %, furthermore preferably 0.03 to 1.0 mass % with an ethanol solvent. However, the water concentration may be below 0.03 mass %. When it is above 3 mass %, a defect such as peeling of a silica membrane and/or an UF membrane generates to have low separation capacity. By performing drying and firing under the aforementioned conditions by the use of a silica sol having a water concentration of 0.03 to 3 mass % with an ethanol solvent, the water permeation amount can be improved.

In addition, upon drying the silica sol, since the membrane surface temperature falls due to the vaporization of a solvent such as ethanol or the like contained in the silica sol, the water in the drying air builds up condensation and adheres to the membrane surface. Therefore, the silica particles are disarranged due to the difference in surface tension between water and the solvent such as ethanol to generate a defect. Since the dew condensation is inhibited by the low dew point drying (dew point of −70 to 0° C.) to inhibit a defect, the number of times of the membrane formation for obtaining a silica membrane 1 having no defect can be decreased. That is, by drying the silica sol by the use of a wind having a dew point of −70 to 0° C., a membrane having high separation performance (high separation coefficient) can be obtained, and high separation performance can be obtained with a silica membrane 1 thinner than a conventional membrane. Incidentally, if the dew point of the wind is below the membrane surface temperature (<−70° C.), a separation coefficient merely equivalent to that upon drying with a wind having a dew point of −70° C. is obtained while a large amount of facility costs is necessary. Therefore, it does not have an effect on costs. Accordingly, it is preferable to use a wind having a dew point of −70 to 0° C.

Further, it is preferable to dry silica sol by sending a wind at a rate of 5 to 20 m/s. Such a rate enables to obtain a membrane having a higher separation coefficient. When the wind rate is below 5 m/s, drying of silica sol adhering to the surface of the porous substrate 11 is hardly promoted, and a dense membrane cannot be obtained to form a membrane having a large pore size. In addition, when the wind rate is above 20 m/s, drying rate is high to easily cause a crack on the membrane surface.

In addition, the firing after drying is performed preferably at 200 to 400° C., more preferably at 200 to 350° C. The temperature of 200 to 400° C. is lower than the conventional methods, and a silica membrane 1 having high hydrophilicity can be obtained by firing at temperature within the above range.

The hydrophilicity of the silica membrane 1 can be raised by a silica sol of an ethanol solvent having a low water concentration (0.03 to 3 mass %), dehumidification drying (dew point of −70 to 0° C.), and lowering of the firing temperature (200 to 400° C.). Raising the hydrophilicity of the silica membrane 1 enables to improve water permeation amount. By the hydrophilicity, a hydrophobic aromatic compound and the like is inhibited from entering the solution in dehydration of the solution containing the aromatic compound and the like to inhibit lowering of the water permeation amount.

As shown in FIG. 1, an UF membrane 14, which is an ultrafiltration membrane having a pore size of 0.5 to 20 nm, is formed on a microfiltration membrane (MF membrane) 11, and the silica membrane 1 is formed on the UF membrane 14. As the UF membrane 14, for example, titania can be employed. The silica membrane 1 has a multilayer structure obtained by laminating silica sol plural times.

As described above, when a silica membrane 1 is formed on the UF membrane 14, since the membrane surface of the UF membrane 14 is flat and smooth and has few defects, it is possible to form a thin silica membrane 1 with no defect. That is, it becomes possible to manufacture a silica membrane 1 having high separation performance and a high permeation flux (water permeation amount) at low costs.

On the other hand, when the silica membrane 1 is formed on the microfiltration membrane (MF membrane) without forming the UF membrane 14, a ceramic layer becomes thick due to unevenness of the MF membrane in order to coat all the surface of the MF membrane with the silica membrane 1, thereby having a low permeation flux (water permeation amount). In addition, since the surface of the MF membrane is uneven, the silica membrane 1 becomes nonhomogeneous to easily cause a defect such as a crack or the like. That is, the silica membrane has a low separation performance. Further, in order not to cause a crack, only a thin membrane is formed at one time, and therefore, the number of steps increases to raise the costs. Therefore, it is desirable that the UF membrane 14 is formed so that the surface of the UF membrane 14 may serve as the surface of the substrate to subsequently form a silica membrane 1 thereon.

By forming the silica membrane 1 on the UF membrane 14 with the UF membrane 14 functioning as the substrate for forming the silica membrane 1, there can be formed a silica membrane 1 having few defects, i.e., a silica membrane 1 having high separation performance. The outermost surface layer of the substrate is a base layer for forming a membrane, i.e., the UF membrane 14. In addition, according to a method of bringing the slurry described below into contact with the substrate by flowing down from the above to allow the slurry to adhere to the substrate, since no water pressure is applied to the membrane formation surface of the substrate, the silica sol is infiltrated just into the UF membrane 14 due to a capillary force, and penetration into the substrate (porous substrate 11 and the like) having large pores is inhibited. In addition, even if the substrate is long, there is little difference in the silica sol adhesion amount between the top and the bottom, and a homogeneous membrane can be obtained in the longitudinal direction. Further, by performing blast drying, a dense silica membrane 1 can be formed.

As shown in FIG. 2, the ceramic filter 10 is partitioned and formed by partition walls 22 to form a monolith shape having a plurality of cells 23 forming fluid passages in the axial direction. In the present embodiment, the cells have a circular cross section, and a silica membrane 1 as shown in FIG. 1 is formed in the inner wall surface of each of the cells 23. The cells 23 may be formed to have a hexagonal or square cross section. According to such a structure, for example, if a mixture (e.g., water and phenol) is introduced into the cells 23 from the inlet side end face 25, one of the constituents of the mixture is separated at the silica membrane 1 formed on the inner walls of the cells 23, passes through the porous partition walls 22, and is discharged from the outermost wall of the ceramic filter 10. Therefore, the mixture can be separated. That is, the silica membrane 1 formed in the ceramic filter 10 can be used as a separation membrane and has a high separation property for, for example, water and phenol.

The porous substrate 11 having a substrate main body is formed as a circular columnar monolith type filter element made of porous material by extrusion forming or the like. As the porous material, alumina can be employed in that it has corrosion resistance, has less change in the pore size of the filtration portion due to temperature change, and can obtain sufficient strength. However, besides alumina, ace ramie material such as cordierite, mullite, silicon carbide or the like can be used. The porous substrate 11 means a porous body having a large number of pores having a small pore size with the pore size of the surface (outermost surface layer) for forming the silica membrane 1 being preferably 0.5 to 20 nm, more preferably 0.5 to 10 nm. The porous body may be a body where a porous membrane having a pore size in the aforementioned range is formed on the surface thereof (In the embodiment of FIG. 1, the UF membrane 14 forms the outermost surface layer of the aforementioned range).

since the silica membrane 1 of the invention is formed on the inner peripheral surface (inner wall surfaces) of the porous substrate 11, there can suitably be used a relatively long cylindrical substrate having a length of 50 cm or more or a lotus root-shaped porous substrate.

Next, a method for manufacturing a silica membrane 1 will be described by the use of FIGS. 3A and 3B. In the first place, a coating liquid (silica sol) 40 for forming a silica membrane 1 is prepared. Tetraethoxysilane is hydrolyzed in the presence of nitric acid to obtain a silica sol, the silica sol is diluted with ethanol to have a silica sol concentration of 0.05 to 0.7 mass % and a water concentration of 0.03 to 3 mass % to obtain a silica sol solution for forming a membrane (coating liquid) 40.

Figure 3A:
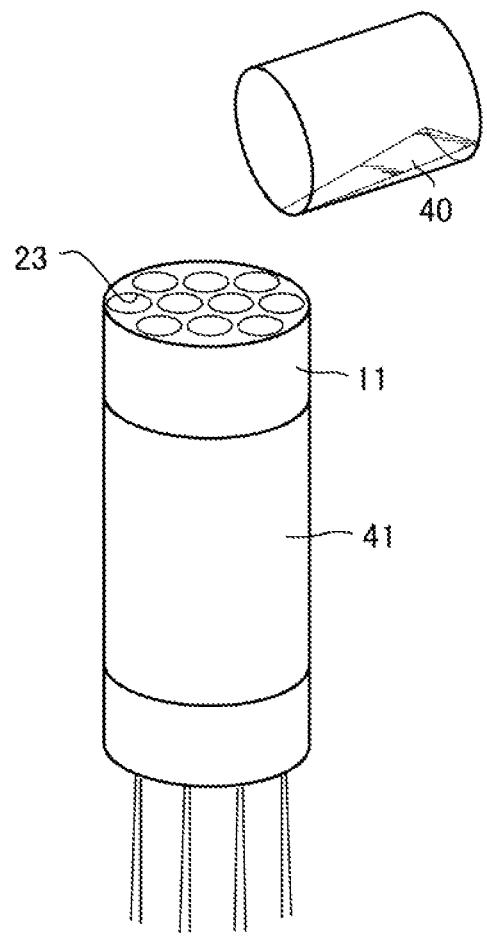
FIG. 3A is a schematic view schematically showing an example of a method for manufacturing a silica membrane of a ceramic filter of the present invention, explaining flowing down of a ceramic sol.

Next, as shown in FIG. 3A, the outer peripheral surface of the porous substrate 11 is masked with a masking tape 41. For example, the porous substrate 11 is fixed to the bottom end of a wide-mouth funnel (not illustrated), and the aforementioned silica sol solution (coating liquid) 40 is poured into the funnel from above the substrate to allow the solution to pass through the cell 23 (falling method). Alternatively, a silica sol solution 40 stored in a tank may be poured by the use of the flow down membrane-forming apparatus. Thus, the silica sol is adhered to the surfaces of the cells 23. Then, a wind is sent from the top portion of the substrate to remove a superfluous silica sol.

Figure 3B:
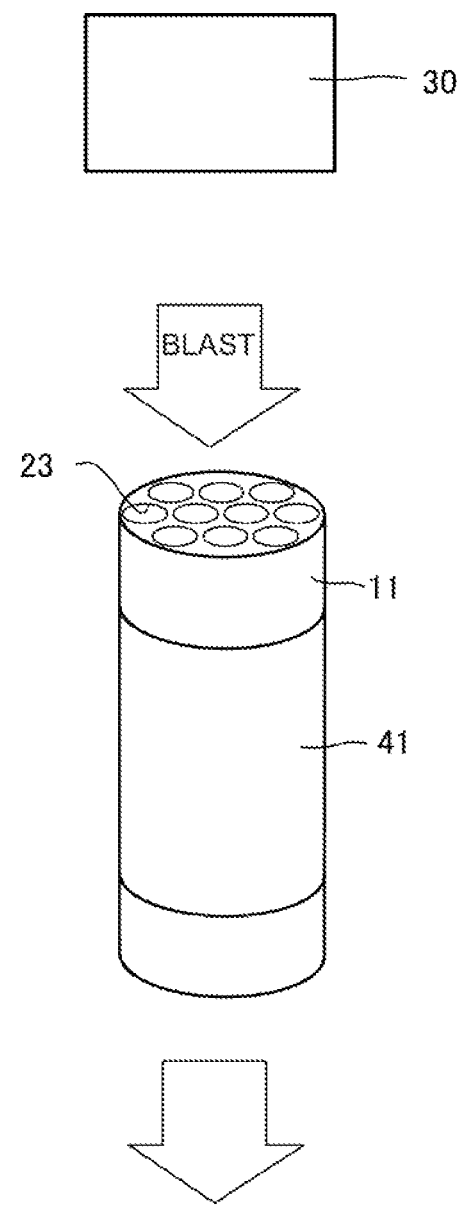
FIG. 3B is a schematic view schematically showing an example of a method for manufacturing a silica membrane of a ceramic filter of the present invention, explaining blast drying.

Next, for example, as shown in FIG. 3B, by sending a wind having a dew point of −70 to 0° C. into the porous substrate 11 from the top thereof by a dehumidification blower, the wind is sent into the cells 23 to dry the silica sol. The air having a dew point of −70 to 0° C. can be obtained by adsorbing moisture by a dehumidification rotor having a honeycomb structure where an adsorbent is firmly bonded. By the blast drying with a wind having a dew point of −70 to 0° C., the silica membrane 1 is formed on the UF membrane 14 with a dense structure to be able to obtain a membrane having high separation performance. The wind for drying passes through the cells at a rate of preferably 5 to 20 m/sec. When the rate is below 5 m/sec., drying takes too long time. When the rate is above 20, a crack is easily caused on the membrane surface, which is not preferable. Thus, blast drying gives a structure where the silica membrane 1 is densely formed on the UF membrane 14. Since drying of the solvent on the membrane surface is considered to be important, the vaporization of the solvent containing the silica sol from the substrate side may be inhibited by masking the outer peripheral surface. Incidentally, it is preferable that the blast drying is performed right after the adhesion of silica sol, for example, within 30 seconds. Because starting drying right after the membrane formation enables to inhibit the silica sol from infiltrating into the substrate.

The temperature of the wind is preferably 10 to 80° C. When a wind having a temperature of below 10° C. is sent, drying of the silica sol adhering to the cell surfaces does not proceed, a dense membrane cannot be obtained to form a membrane having a large pore size. When a wind having a temperature of above 80° C. is sent, a crack is easily caused on the membrane surface, which is not preferable.

Then, temperature is raised at a rate of 20 to 100° C./hr, kept at 200 to 400° C. for 30 min. to 3 hours, and then lowered at a rate of 20 to 100° C./hr. The aforementioned operations of pouring of the coating liquid (silica sol) 40, drying, raising temperature, and lowering temperature are repeated 2 to 5 times.

Incidentally, the formation of the silica membrane 1 is not limited to pouring of silica sol (flow down method) as shown in FIG. 3A, and it is possible to employ a dipping method or other methods, followed by blast drying as shown in FIG. 3B.

By the aforementioned steps, the silica membrane 1 is formed on the surface of the UF membrane 14 functioning as a substrate.

A ceramic filter 10 obtained above to have a nano-level thin silica membrane 1 on the inner wall surface has a large water permeation amount and can suitably be used as a filter for separating a mixed liquid or the like.

EXAMPLE

Hereinbelow, the present invention will be described more specifically on the basis of Examples. However, the present invention is by no means limited to these Examples.

Examples 1 to 10

(1) Porous Substrate

A monolith-shaped substrate (outer diameter of 30 mm, cell inner diameter of 2.5 mm×55 cells, length of 160 mm) having a titania ultrafiltration membrane (UF membrane) having an average pore size of 8 to 20 nm formed on the microfiltration membrane (MF membrane) was used as the substrate (porous substrate 11). Incidentally, both the end portions of the substrate were sealed with glass.

(2) Silica Sol

Tetraethoxysilane was hydrolyzed in the presence of nitric acid to obtain a silica sol solution. The silica sol solution was diluted with ethanol, and a water content was adjusted to 0.03 to 3 mass % to obtain a silica sol solution for forming a membrane.

(3) Membrane Formation

The outer peripheral surface of the porous substrate 11 was masked with a masking tape 41. The porous substrate 11 was fixed to a flow down membrane-forming apparatus. A silica sol solution was stored in a tank of the flow down membrane-forming apparatus, and the silica sol solution was poured into the cells from above the substrate to pass through the cells. Then, a wind was sent from the top of the substrate with a wind rate of 5 m/s to remove a superfluous silica sol. Incidentally, it was confirmed that the membrane was formed over the entire inner wall surfaces by the membrane-forming step.

(4) Drying

The inside of the cells 23 of the porous substrate 11 where the silica sol was allowed to adhere by pouring the silica sol solution was dried for 30 minutes by passing a wind having room temperature by the use of a dehumidification blower 30 within 30 seconds after the pouring was completed.

(5) Firing

The masking tape on the outer peripheral surface of the porous substrate 11 was removed, and the temperature was raised at a temperature rise rate of 25° C./hr. in an electric furnace, maintained at 200 to 400° C. for one hour, and then lowered at a temperature fall rate of 25° C./hr. Incidentally, the operations of the above (3) to (5) were repeated twice to obtain samples of Examples.

Comparative Examples 1 to 5

Regarding Comparative Examples 1 to 5, the samples were obtained in the same manner as in Examples with the sol water content, drying dew point, and firing temperature shown in Table 1.

(Temperature-Programmed Desorption Analysis of Water)

The temperature-programmed desorption analysis of water was performed by the use of a full automatic temperature-programmed desorption spectrum apparatus (TPD-1-ATw produced by BEL Japan, Inc.). As the sample, 0.05 g of silica gel obtained by drying and firing a silica sol was weighed for the use. The temperature-programmed desorption measurement was performed by detecting a target component with a quadrupole MS (mass spectrometry) according to the temperature program shown below.

(1) Pretreatment: Temperature was raised up to 100° C. (10° C./h) in vacuum, maintained for 60 minutes, and then cooled down to room temperature.

(2) Water vapor adsorption: Water was subjected to bubbling at 30° C. for 30 minutes in a He current (100 ml/min.).

(3) Water vapor desorption: Purging was performed at 30° C. for 60 minutes in a He current (50 ml/min.).

(4) Temperature-programmed desorption measurement: Temperature was raised from 30° C. to 800° C. (10° C./min.) in a He current (50 ml/min.), and desorbed water vapor was detected with a quadrupole MS.

Figure 4:
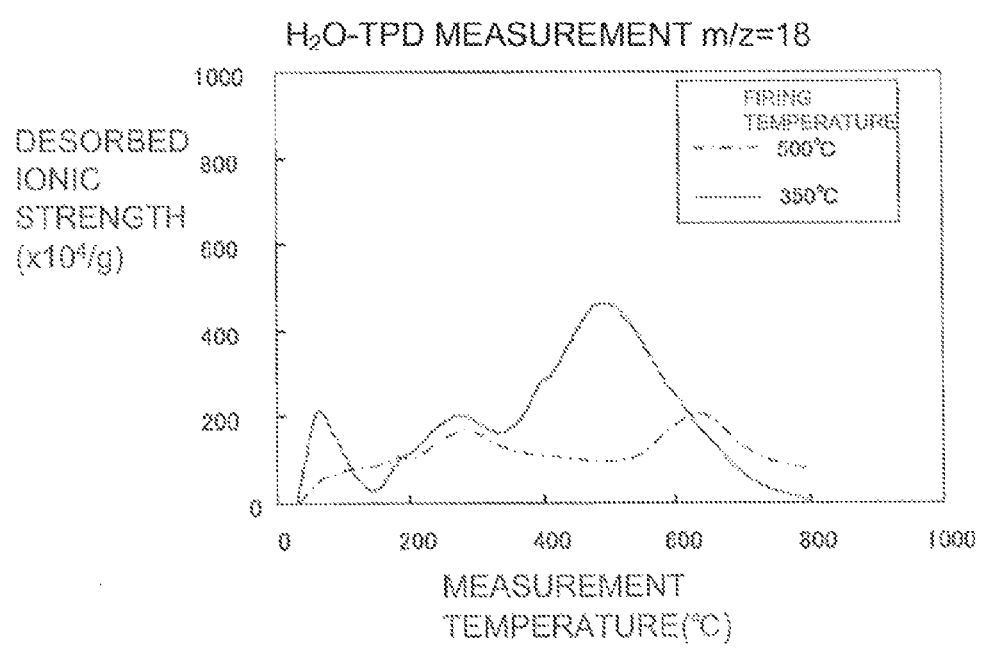
FIG. 4 is a graph showing desorbed ionic strength of water by temperature-programmed desorption.

FIG. 4 shows desorbed ionic strength of water measured by temperature-programmed desorption analysis of water of the sample having a firing temperature of 350° C. (Example 2) and the sample having a firing temperature of 500° C. (Comparative Example 1). With raising temperature from 30 to 800° C., desorbed ionic strength of water was measured. The horizontal axis of the graph shows measurement temperature, and the vertical axis shows desorption ionic strength of water. The peak of the measurement temperature of 500° C. is a peak derived from a silanol group (N. Hirashita, S. Tokitoh and H. Uchida, Jpn. J. Appl. Phys., 32 (1993) 1787-1793). The sample of firing temperature of 350° C. had a large peak derived from a silanol group and high hydrophilicity. The desorbed ionic strength of water of a measurement temperature of 500° C. of each sample is shown in Table 1. In addition, the water permeation rate in Table 1 shows initial performance (after one hour from the start of the test). The water permeation deterioration rate is a deterioration rate of the permeation rate (after 100 hours from the start of the test) to the initial performance (after one hour from the start of the test).

(Separation Test)

The water-phenol solution separation test was performed (Examples 1 to 9, Comparative Examples 1 to 5). Specifically, an aqueous solution having a temperature of 75° C., a phenol concentration of 85 mass, and water of 15 mass % was passed through the cells 23 of a monolith (porous substrate 11) having a silica membrane 1 formed therein at the solution flow rate of 10 L/min., and pressure was reduced at a vacuum rate of about 50 Torr from the side surface of the substrate to trap the permeated solution from the side surface of the substrate by a liquid nitrogen trap.

In addition, a water-acetic acid separation test was performed (Example 10). Specifically, an aqueous solution having a temperature of 70° C., am acetic acid concentration of 65 mass, and water of 65 mass % was passed through the cells 23 of a monolith (porous substrate 11) having a silica membrane 1 formed therein at the solution flow rate of 10 L/min., and pressure was reduced at a vacuum rate of about 50 Torr from the side surface of the substrate to trap the permeated solution from the side surface of the substrate by a liquid nitrogen trap.

(Water Permeation Amount Decrease Rate)

The water permeation amount decrease rate after 100 hours was obtained as a rate of the decrease amount of the water permeation amount after 100 hours from the initial water permeation amount to the initial water permeation amount. That is, the water permeation decrease rate was obtained by (initial water permeation amount−water permeation amount after 100 hours)/initial water permeation amount. For example, in the case that the initial water permeation amount is 5 kg/m²·h and that a water permeation amount after 100 hours is 3 kg/m²·h, the water permeation amount decrease rate is (5−3)/5, which is 0.4 (=40%).

|  | Sol water content Mass % | Drying dew point °C. | Firing temperature °C. | Desorbed ionic strength of water (500° C.) ×10⁴/g | Water permeation amount Kg/m²·h | Water permeation amount decrease rate % | Organic compound |
|---|---|---|---|---|---|---|---|
| Example 1 | 1 | −50 | 400 | 400 | 4.8 | 18 | Phenol |
| Example 2 | 1 | −50 | 350 | 470 | 5.5 | 12 | Phenol |
| Example 3 | 1 | −50 | 300 | 600 | 6.2 | 8 | Phenol |
| Example 4 | 1 | −50 | 200 | 650 | 6.6 | 6 | Phenol |
| Example 5 | 1 | 0 | 350 | 400 | 4.6 | 18 | Phenol |
| Example 6 | 1 | −70 | 350 | 550 | 5.8 | 10 | Phenol |
| Example 7 | 0.03 | −50 | 350 | 530 | 5.6 | 11 | Phenol |
| Example 8 | 3 | −50 | 350 | 420 | 5.0 | 18 | Phenol |
| Example 9 | 1 | 0 | 400 | 280 | 3.7 | 23 | Phenol |
| Example 10 | 1 | −50 | 350 | 470 | 3.5 | 20 | Acetic acid |
| Comp. Ex. 1 | 1 | −50 | 500 | 100 | 2.1 | 35 | Phenol |
| Comp. Ex. 2 | 1 | −50 | 600 | 60 | 1.8 | 40 | Phenol |
| Comp. Ex. 3 | 1 | 20 | 350 | 120 | 2.3 | 32 | Phenol |
| Comp. Ex. 4 | 5 | −50 | 350 | 150 | 2.4 | 30 | Phenol |
| Comp. Ex. 5 | 1 | 20 | 500 | 80 | 2.0 | 38 | Phenol |

As shown in Table 1, in Examples 1 to 10, the desorbed ionic strength of water having a temperature of 500° C. in the temperature-programmed desorption analysis of water of the silica membrane could be made to be 2,000,000/g or more by specifying the water concentration of silica sol to 0.03 to 3 mass %, a dew point (drying dew point) of drying wind of −70 to 0° C., and a firing temperature of 200 to 400° C. Since the desorbed ionic strength in temperature-programmed desorption analysis of water having a temperature of 500° C. of silica membrane was 2,000,000/g, the water permeation amount decrease rate was small in comparison with Comparative Examples 1 to 5. In addition, in Example 10, an acetic acid separation test was performed with a membrane under the same conditions as in Example 2. The water permeation amount decrease rate of Example 2 was smaller than that of Example 10. From this, it could be understood that the decrease of the water permeation amount can be inhibited more by an aromatic (phenol, molecular weight of 94) having a larger molecular weight than that of acetic acid (molecular weight of 60).

In a method for obtaining a silica gel (silica membrane) from a silica sol, there is a description of "OH seems to be present on the surface as a silanol group (SiOH)" in a document ("Science of Sol-Gel Method" authored by Sumio Sakka and published by AGUNESUSHOFU Ltd., page 155). As more silanol groups which seem to have high affinity with H₂O are present on the surface, hydrophilicity seems higher. In a silica membrane of the present invention, the desorbed ionic strength of water having a temperature of 500° C. in the temperature-programmed desorption analysis of water is 2,000,000/g or more, and the peak (peak of water at 500° C.) derived from a silanol group is large. That is, according to a method for manufacturing a silica membrane of the present invention, it seems that, since the amount of silanol groups on the surface is increased to become highly hydrophilic, the water permeation flow rate improves.

(Gas Permeation Test)

Figure 5:
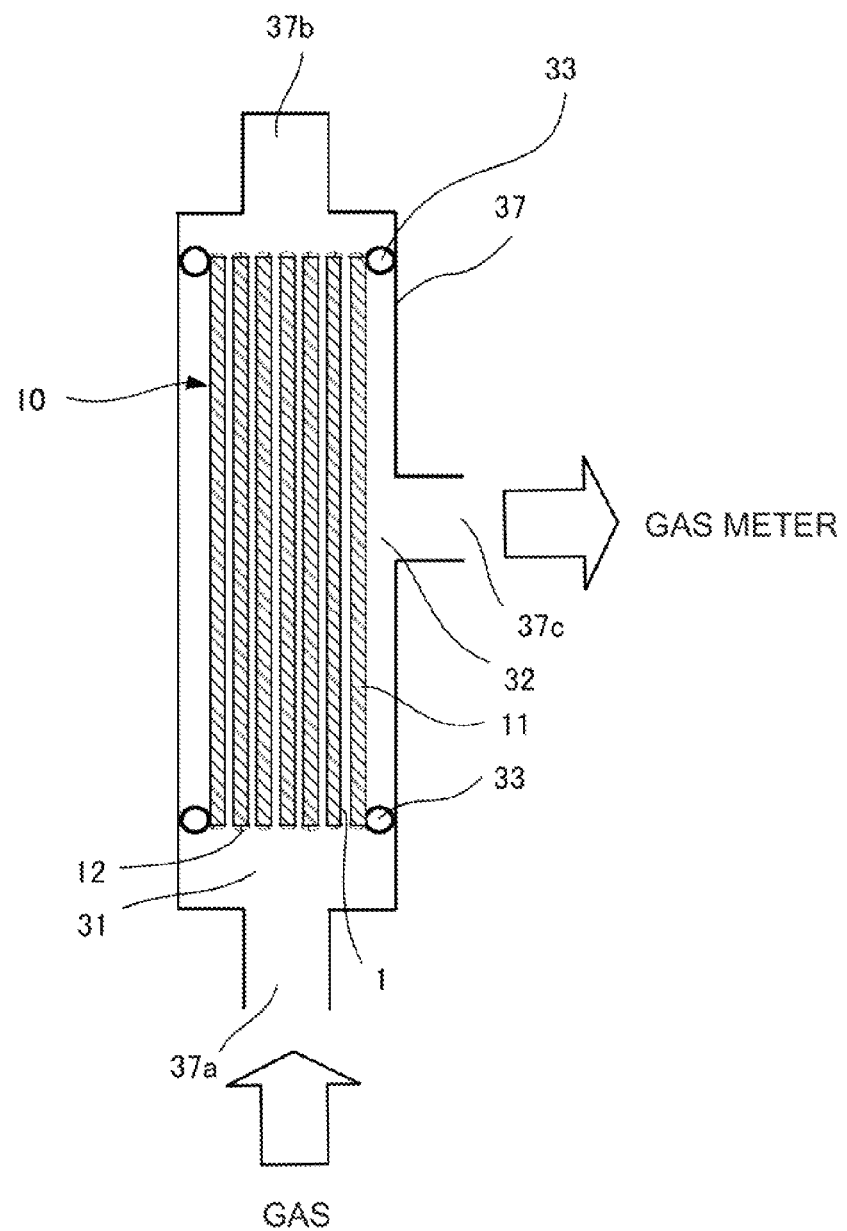
FIG. 5 is a schematic view showing an apparatus used for a gas permeability test.

(1) A monolith-shaped substrate (ceramic filter 10) where a separation membrane (silica membrane 1) was formed was housed in a SUS casing by means of an o-ring in the outer peripheral portion of both the end portions of the substrate (SUS module 37). As shown in FIG. 5, the SUS module 37 is separated into a gas feed side space 31 and a gas permeation side space 32 by the o-ring 33, a glass seal 12, and a separation membrane (silica membrane 1).

(2) Gas (He, SF₆ gas) was fed to the gas feed side space 31 of the SUS module 37 at room temperature with a cylinder connected to a feed gas introduction port 37a. Since the gas feed side space 31 is blocked in a latter part (feed gas discharge port 37b) of the SUS module 37, the gas fed to the gas feed side space 31 applies a predetermined pressure to the separation membrane (silica membrane 1). In the present test, the gas feed side space 31 had a gauge pressure of 0.1 MPa, and the gas permeation side space 32 had an atmospheric pressure. After the stability of the gas permeation flow rate was confirmed, the permeation rate of He gas and SF₆ gas measured by a dry gas meter or a soap membrane flowmeter arranged on the gas collection port 37c side was obtained to obtain a permeation rate ratio.

In all the Examples, the ratio of gas permeation performance (the permeation amount of $SF_6$ (molecular diameter of 0.55 nm) to the permeation amount of He (molecular diameter of 0.26 nm) (=$SF_6$/He)) is 0.3 or less. As the ratio of the permeation amount of $SF_6$, which has a large molecular diameter, is smaller, the membrane has less coarse pores and higher separation performance, and silica membranes of Examples had few coarse pores.

A silica membrane of the present invention has high separation performance and high permeation performance. It can suitably be used as a separation membrane or a filter for mixed liquid, mixed gas, or the like.

What is claimed is:

1. A silica membrane formed on a porous substrate, wherein a desorbed ionic strength of water having a temperature of 500° C. in a temperature-programmed desorption analysis of water of the silica membrane is 2,000,000/g or more, and wherein the silica membrane is manufactured by a method comprising:

allowing a silica sol having a water concentration of 0.03 to 3 mass % with an ethanol solvent to adhere to a porous substrate,
drying the silica sol by blowing air having a dew point of −70 to 0° C., and
firing the dried silica sol at 200 to 400° C.

2. The silica membrane according to claim 1, wherein the silica membrane selectively separates water from an organic solvent containing water.

3. The silica membrane according to claim 2, wherein the organic solvent has a molecular weight of 60 or more.

4. The silica membrane according to claim 3, wherein the organic solvent is an aromatic compound.

\* \* \* \* \*